(No Model.)

J. L. KOPLIN.
DUMPING CAR.

No. 470,299. Patented Mar. 8, 1892.

Witnesses:
E. Behel.
L. L. Miller.

Inventor:
James L. Koplin
By A. O. Behel
Attys.

THE NORRIS PETERS CO., PHOTO-LITHO., WASHINGTON, D. C.

UNITED STATES PATENT OFFICE.

JAMES L. KOPLIN, OF ROCKFORD, ILLINOIS.

DUMPING-CAR.

SPECIFICATION forming part of Letters Patent No. 470,299, dated March 8, 1892.

Application filed September 1, 1891. Serial No. 404,476. (No model.)

*To all whom it may concern:*

Be it known that I, JAMES L. KOPLIN, a citizen of the United States, residing at Rockford, county of Winnebago, and State of Illinois, have invented certain new and useful Improvements in Dumping Car and Wagon Boxes, of which the following is a specification.

The object of this invention is, first, to expedite the unloading of coal, earth, grain, and like substances, and, secondly, to materially lessen the labor of the unloading operation.

In the accompanying drawings I illustrate my invention in its application to a wagon-box, and therein—

Figure 1:
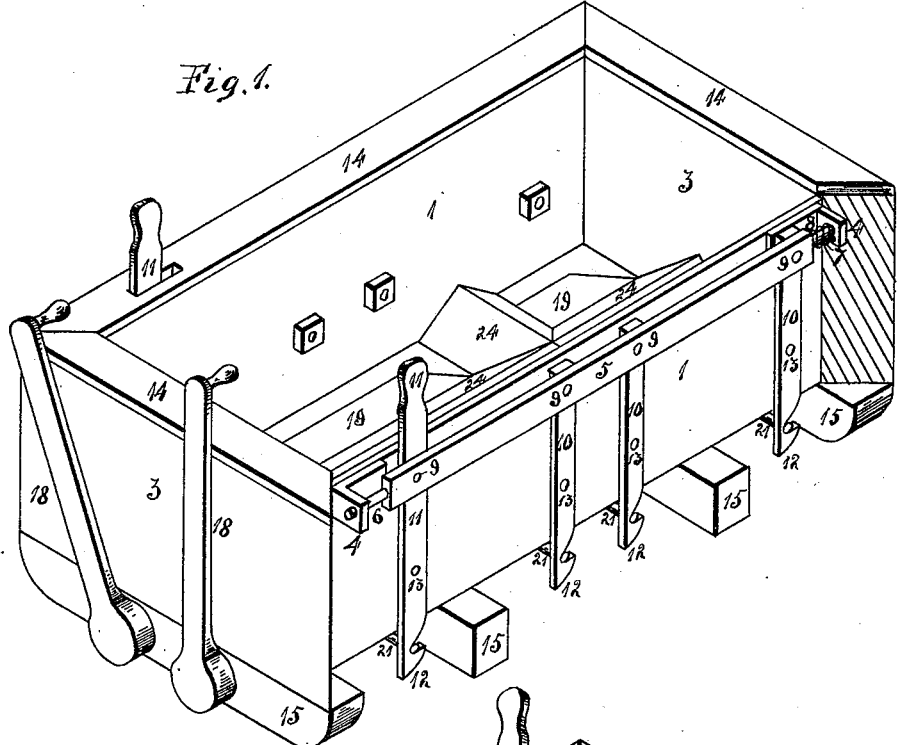
Figure 2:
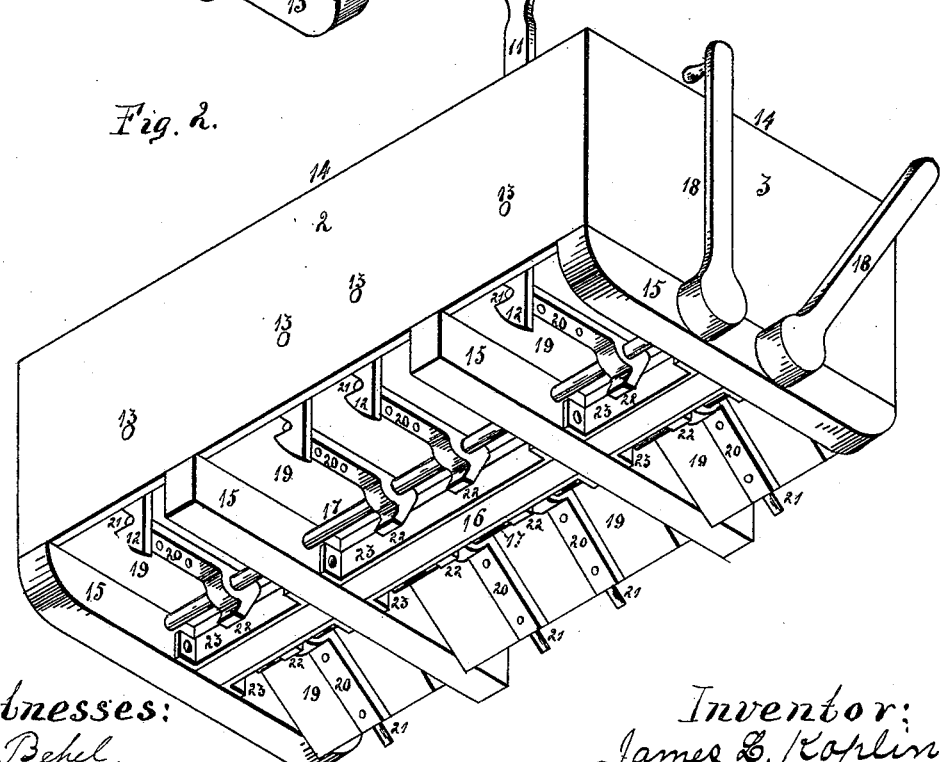

Figure 1 is an isometrical representation of a wagon-box embodying my dumping device, seen from the forward end, showing the farther side of the bottom dropped for dumping. Fig. 2 is likewise an isometrical representation looking underneath the box to show the means of supporting the bottom-boards and how they open from the sides of the box.

In the construction of my dumping-box I employ the double side-boards 1 and 2 and the forward and rear end-boards 3, and these I secure together in any suitable manner at a little distance from the ends of the side-boards 1. Near their upper edges I secure the right-angled iron 4, provided with a round hole near the center of its outwardly-extending ear. Between these two brackets is the longitudinal bar 5, the ends of which terminate in round shanks 6 and 7, which extend through and bear in the holes of the bracket 4, being free to slide backward and forward through a slight distance on the shank 7. On the square shoulders formed by the end of the bar and the bracket I place the spiral spring 8, the action of which holds the bar 5 in its rearward position. At intervals in the length of the sliding bar 5 I provide the holes 9 and here pivotally attach the levers 10 and 11, which extend downward to slightly below the bottom edge of the side-boards 1 and 2 and terminate in the hooks 12. These levers are fulcrumed on the bolts 13 about midway of their length, and the lever 11, nearest the forward end of the box on each side, rises above the side braces a distance sufficient to be within convenient reach of the operator. The face-board 2 of each side covers the levers and the strips 14, laid all around the upper edge, covers the openings between the double side-boards.

At each end of the box on the bottom and at intervals between them (which latter in a wagon will coincide with the bolsters) I secure the bars 15 and in the middle of the box, extending between them, the bars 16. Extending through the transverse bars 15 and journaled in them I place the two shafts 17, one on each side of the center beam 16. On the forward end of each of these two shafts 17 I affix the upwardly-extending lever 18, which rises above the upper edges of the box.

The bottom of my box is made in six sections 19, three on each side, this being necessary to avoid the cross-beams 15 on the box-bottom. These bottom sections are pivoted on brackets 20, rigidly affixed to the shafts 17, and terminating at their outer ends in the round shanks 21, which are engaged and supported by the hooks 12, where the box-bottom is in a horizontal position. The rear end 22 of each of the brackets 20 is turned downward, forming, with the bottom-boards 19, an acute angle, the object being to limit the opening of the bottom by the extensions 22 striking against angle-iron 23, which I secure to the sides of the cross-beam 15 to prevent unnecessary wear and to increase its strength.

That the earth or other substance will not remain on the upper edges of the beams 15 and 16 I fasten over them the three-cornered strips 24, the bottoms of which, being somewhat wider than the beams they cover, extend over their edges, forming tongues under which the bottom-boards close.

The operation of my dumping device is as follows: The box, being previously loaded, is drawn where it is desired to unload. The operator grasps one of the levers 11, or if he wishes to unload the whole simultaneously both levers, and pulls backward upon them. By this action the hooks 12 are disengaged from the projecting pins 21 of the box-bottom and the outer edges, being unsupported, fall until the rear end 22 of their brackets strike the iron straps 23, which is a sufficient distance to allow the load to slide out of the openings thus formed. When the wagon is unloaded, the bottom is returned to a horizontal position by the levers 18. The pins 21, striking the hooks 12, throw them forward against the action of the spiral springs 8 until, passing the shoulder of the hooks, the springs cause them to again engage the pins and support the bottom of the box.

I claim as my invention—

1. A dumping-box comprising sides and ends, two shafts extending lengthwise of the box, and a hinged bottom portion fixed to each shaft.

2. A dumping-box comprising fixed sides and ends, two shafts extending lengthwise of the box, a hinged bottom portion fixed to each shaft, each portion of said bottom being in three sections, stops to limit the downward movement of the bottom, and supports for the free ends of the bottom.

3. A dumping-box comprising fixed sides and ends, two shafts extending lengthwise of the box, a hinged bottom portion fixed to each shaft, a lever for oscillating each shaft, stops to limit the downward movement of the bottom sections, supports for their free ends, and means for withdrawing the supports.

4. A dumping-box comprising fixed sides and ends, two shafts extending lengthwise of the box, a hinged bottom portion fixed to each shaft, a lever for oscillating each shaft, supports for the free ends of the bottom sections, a lever for withdrawing the supports, and stops for limiting the downward movement of the bottom.

5. A dumping-box comprising sides and ends, two shafts extending lengthwise of the box, a half-bottom fixed on each shaft, projections from the outer edges of the bottoms, hooks on the sides for engaging the projections, and a lever for each side, by means of which the hooks are moved out of their engagement with the projections.

6. A dumping-box comprising fixed sides and ends, bottom beams, two shafts extending lengthwise of the box, having levers on their forward ends, brackets on each shaft, a half-bottom on each side secured to the brackets, a projection from each bracket, hooks on the sides to engage the projections, a lever for moving the hooks from their engagement with the projections, and an extension from each of the brackets for limiting the downward movement of the bottom.

JAMES L. KOPLIN.

Witnesses:
A. O. BEHEL,
L. L. MILLER.